April 15, 1947. S. PITT ET AL 2,418,951
WELDING APPARATUS
Filed June 29, 1944 3 Sheets-Sheet 1
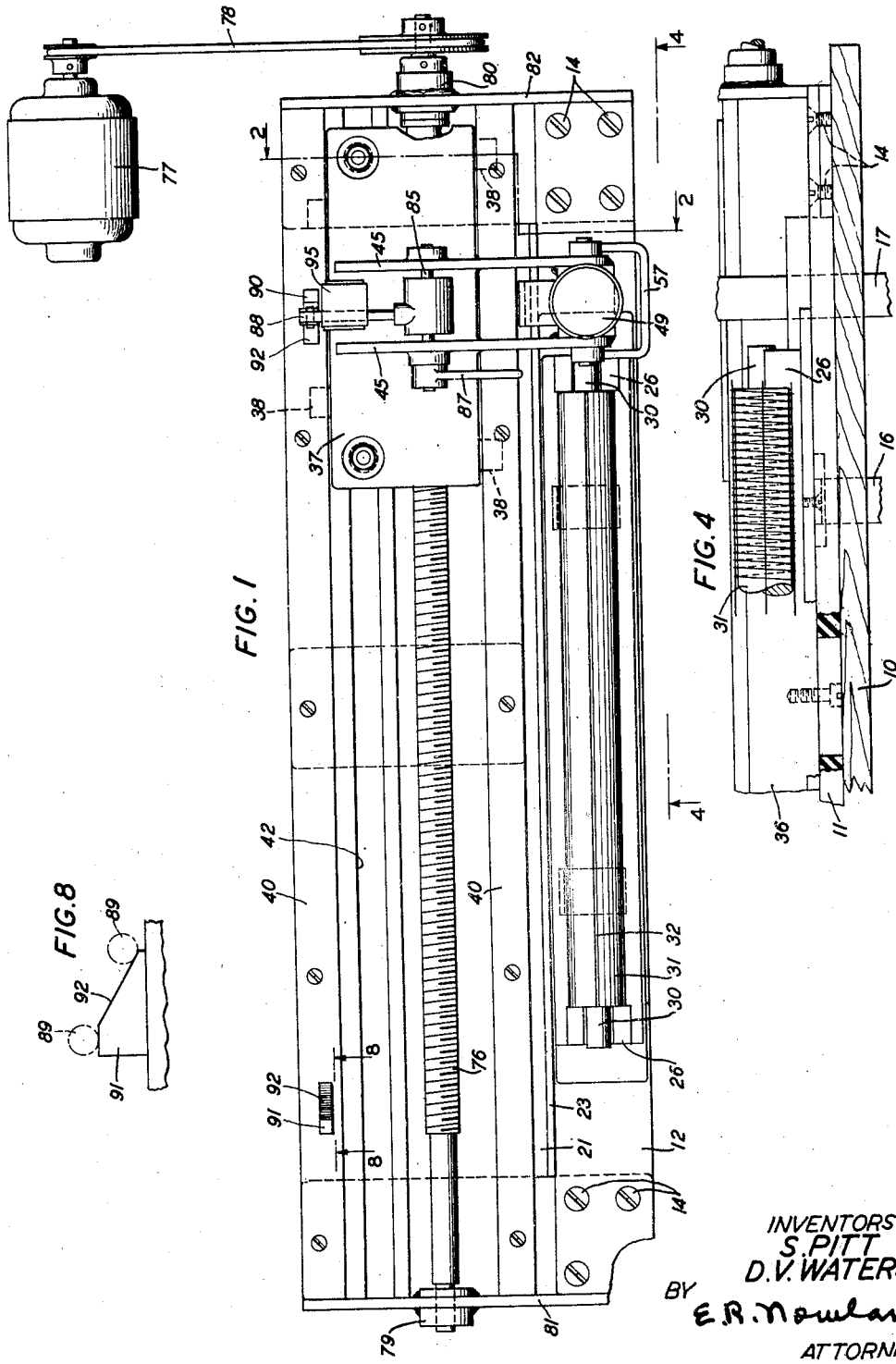
INVENTORS
S. PITT
D. V. WATERS
BY E. R. Nowlan
ATTORNEY

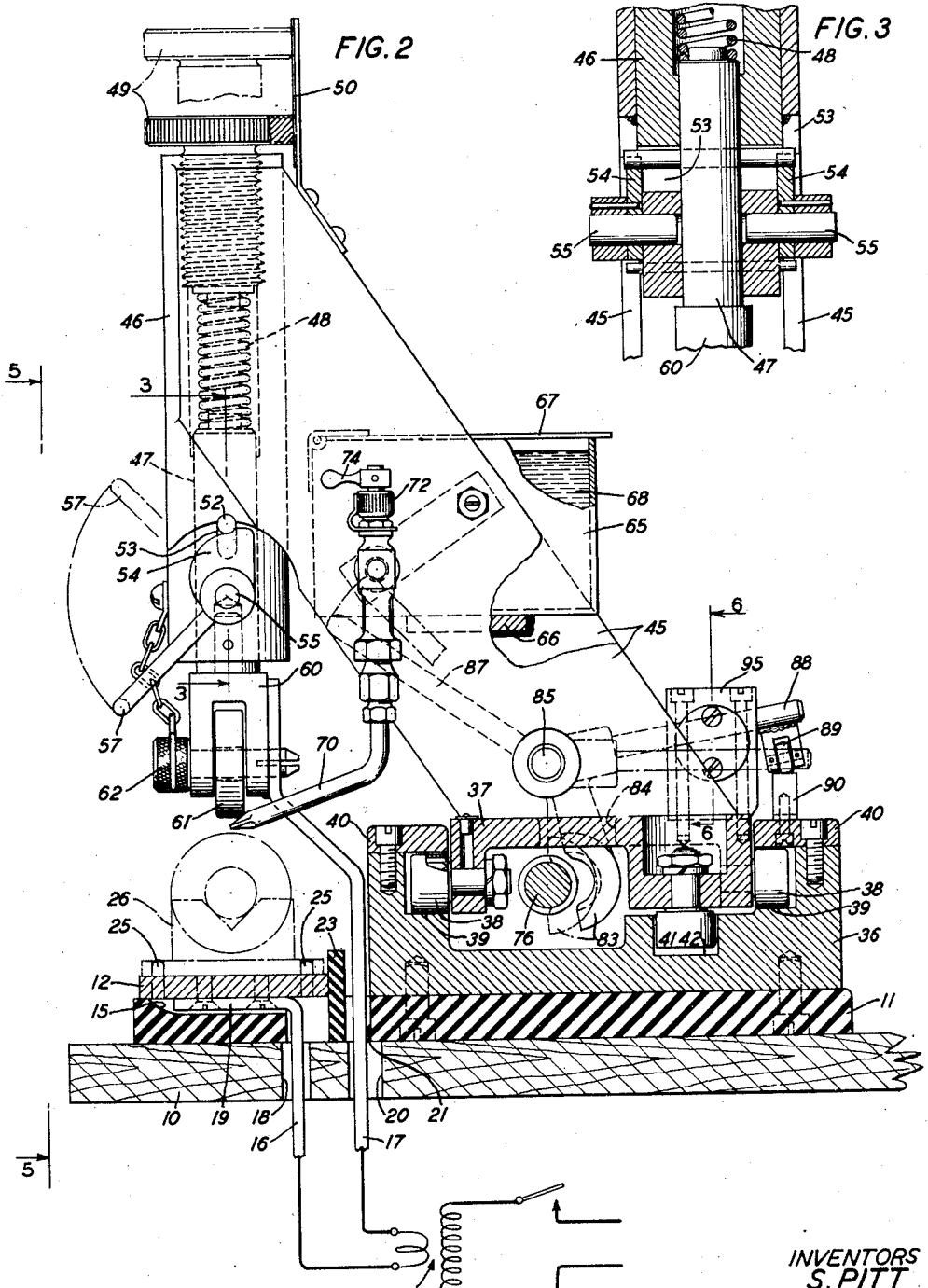

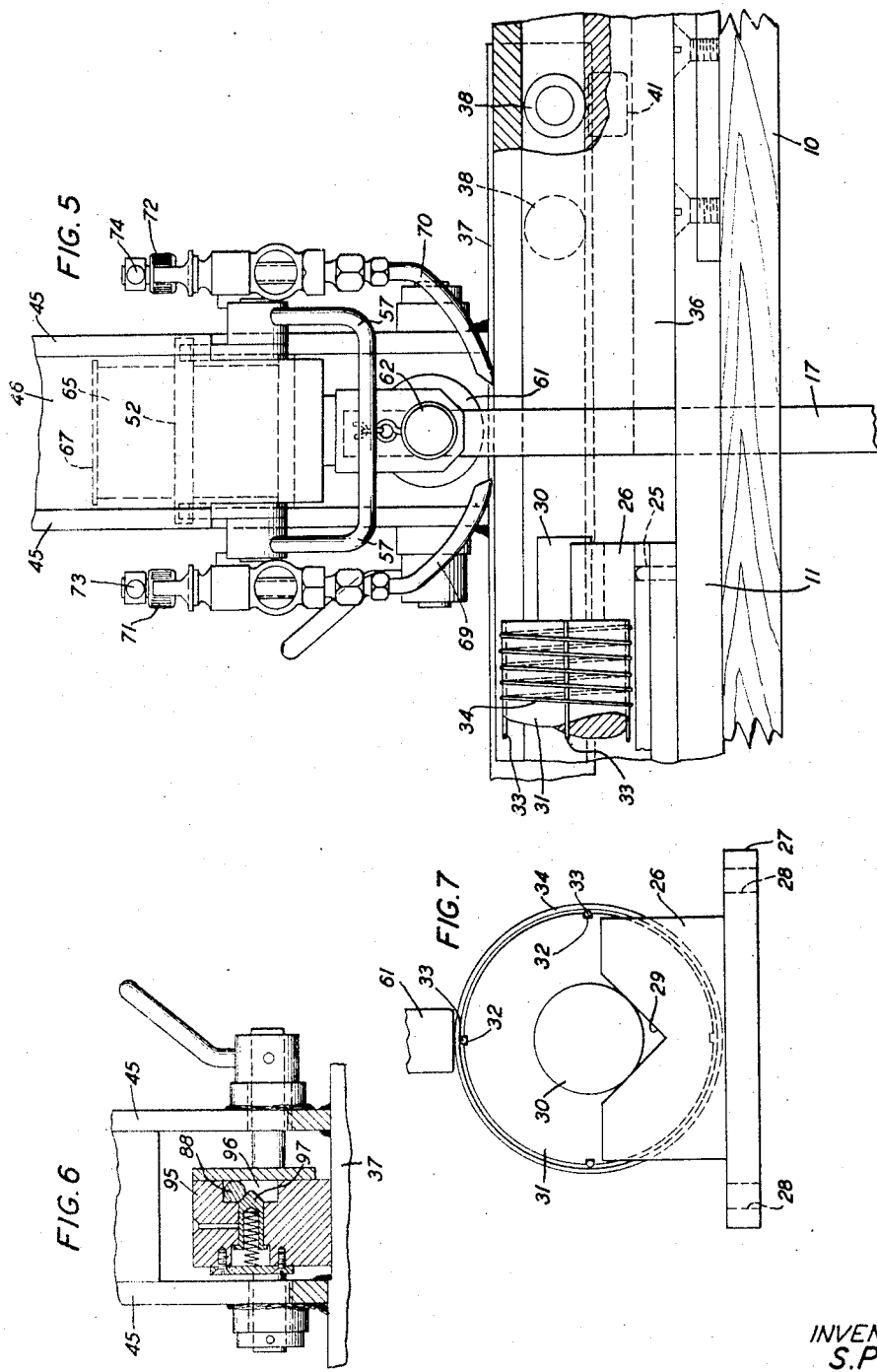

Patented Apr. 15, 1947

2,418,951

UNITED STATES PATENT OFFICE 2,418,951

WELDING APPARATUS

Samuel Pitt, Westfield, and Daniel Vaughn Waters, Flemington, N. J., assignors to Western Electric Company, Incorporated, New York, N. Y., a corporation of New York Application June 29, 1944, Serial No. 542,668

5 Claims. (Cl. 219—4)

This invention relates to welding apparatus, and more particularly to apparatus for welding grid structures for vacuum tubes.

In certain types of grid structures for vacuum tubes, the grid wires are spirally wound on a mandrel including supports, such as longitudinal wires, to which the convolutions of the grid wire are to be secured by welding.

An object of the invention is to provide a welding apparatus which is simple in structure and highly efficient for the welding of grids.

With this and other objects in view, the invention comprises a welding apparatus having a support for a mandrel, upon which a supporting member is disposed longitudinally thereof and a wire wrapped spirally thereon, to serve as an electrode, a movable electrode mounted for movement longitudinally of the mandrel to cause welding of the convolutions of the wire to the support, and means to feed an inflammable material to the wires in advance of the movable electrode.

Other objects and advantages will be apparent from the following detailed description when considered in conjunction with the accompanying drawings, wherein Fig. 1 is a top plan view of the welding apparatus;

Fig. 2 is a vertical sectional view taken substantially along the line 2—2 of Fig. 1;

Fig. 3 is a fragmentary sectional view taken along the line 3—3 of Fig. 2;

Fig. 4 is a fragmentary front elevational view taken along the line 4—4 of Fig. 1;

Fig. 5 is a fragmentary front elevational view taken along the line 5—5 of Fig. 2;

Fig. 6 is a fragmentary sectional view taken along the line 6—6 of Fig. 2;

Fig. 7 is an enlarged vertical sectional view of a portion of the apparatus, and Fig. 8 is an enlarged fragmentary detail view of one of the control cams, this view being taken along the line 8—8 of Fig. 1.

Referring now to the drawing, the apparatus is mounted upon a suitable support such as a bench 10 and has a base 11 of a suitable insulating material. A copper plate 12 extends the full width of the base 11 and is fixed thereto, as at 14, adjacent the ends thereof. The base 11 is cut away, as at 15, to receive busbars 16 and 17, the former extending vertically through an aperture 18 in the bench 10 and having a lateral portion 19 fixed to the copper plate 12, as illustrated in Fig. 2. The bus-bar 17 extends through an aperture 20 in the bench 10 and through the cutaway portion 15 of the base 11. The part of the cutaway portion indicated at 21 extends longitudinally of the base 11 in the form of a slot with the aperture 20, which may also be termed an elongate slot, for the movement of the bus-bar 17 with its movable electrode as will hereinafter be described. The bus-bars 16 and 17 are electrically connected to the secondary winding of a transformer 22 of a welding circuit as illustrated in Fig. 2. An insulating strip 23 extends the full length of the slot 21 to serve as a shield between the bus-bar 17 and the copper plate 12.

The copper plate 12 carries sets of pins 25 at selected positions for supporting elements 26 of the contour illustrated in Figs. 2 and 7. The supporting elements 26 have base portions 27 apertured at 28 to receive the pins 25 and also have V-grooves 29 in their upper surfaces to receive the reduced ends 30 of a mandrel 31. The mandrel 31 in the present embodiment is of the size illustrated in Figs. 1 and 2 but may be of varied lengths and/or diameter, depending upon those required for the grid structures to be welded. To compensate for the variation in the length of the mandrels, the supporting elements 26 may be disposed at varied positions upon the copper plate 12 through the aid of the pins 25. In the present illustration the mandrel 31 is formed of copper cylindrical in general contour, with its reduced ends adapted to rest and be centrally aligned in the V-grooves 29. Recesses 32 are formed in the periphery of the mandrel at spaced positions as illustrated in Fig. 7, to receive supports or mounting wires 33 which are to be welded to the convolutions of a spirally wound grid wire 34.

A frame 36 of the cross-sectional contour illustrated in Fig. 2 and extending the full length of the base 11, is mounted thereon and formed to receive a carriage 37. Sets of rollers 38 of the carriage 37 are positioned to ride upon tracks 39 beneath guides 40, while a set of rollers 41, positioned to ride in a longitudinal groove 42 of the frame 36, cooperates with the rollers 38 to condition the carriage for longitudinal movement in a given path parallel with the center line of the mandrel 31.

Diagonal members 45, spaced from each other as illustrated in Fig. 1 and integral with the carriage 37, straddle a housing 46 at their upper ends and are fixed thereto by suitable means such as welding. The housing 46 has a shank 47 movably disposed therein and normally urged downwardly through the force of a spring 48. The force of the spring 48 may be varied through the aid of a thumb screw 49, the latter being threadedly disposed in the housing and normally held in any desired adjusted position through the aid of a retaining spring 56. The shank 47 carries a pin 52 which extends laterally through the shank and through elongate apertures 53 in the sides of the housing 46. Cams 54, pivotally supported as at 55 (Figs. 2 and 3), are adapted, through the aid of a U-shaped handle 57, connecting both of the cams for simultaneous movement, to move the shank 47 through the aid of the pin 52 into the upward position as illustrated in Fig. 2. A yoke 60 is carried by the shank 47 and in turn carries a roller electrode 61 through the aid of a removable pin 62. The bus-bar 17 is fixed to the yoke 60 and in this manner the roller electrode 61 is included in the welding circuit.

A tank or receptacle 65, disposed between the diagonal members 45 of the carriage 37, rests upon a lateral support 66 and is secured thereto. A cover 67 normally closes the receptacle 65 and permits access thereto. An inflammable material such as a mixture of alcohol and water, indicated at 68, is disposed in the receptacle and is adapted to be fed to the mandrel through the aid of nozzles 69 and 70 controlled by valves 71 and 72. The valves 71 and 72 are of the commercially known type, adjustable to allow small quantities of the liquid to pass through nozzles and onto the mandrel. Through the aid of cam levers 73 and 74, the valves may be closed against the passage of the liquid to the nozzle.

The means for moving the carriage 37 reciprocally between given limits includes a threaded shaft 76, which is driven by a reversible motor 77 through the aid of a belt and pulley connection 78. The ends of the shaft 76 are journalled in suitable bearings 79 and 80 in end plates 81 and 82 of the housing 36. The connection between the shaft 76 and the carriage 37 is brought about through the aid of a threaded element 83 of the contour illustrated in Fig. 2. The element 83 extends through an aperture 84 in the carriage for movement into operative engagement with the shaft, as indicated in dot and dash lines, or out of operative engagement with the shaft as indicated in solid lines in this figure. The element is pivotally supported, at 85, for movement with the carriage and for movement about the pivot through the aid of a handle 87 or a cam controlled arm 88. The arm 88 carries a cam roller 89 positioned to ride upon either one of the control cams 90 or 91. The contour of the control cam 91 is illustrated in Fig. 8 and the contour of the cam 90 is identical therewith but is disposed in a reverse order so that the diagonal portions of the cams, as indicated at 92, face each other. The cams 90 and 91 are mounted upon the adjacent cover member 40 and are disposed in the path of the roller 89. A unit 95, shown in detail in Fig. 6, includes an aperture 96 through which the arm 88 extends and a spring pressed plunger 97 adapted to be actuated by the arm and to hold the arm with the element 83 in operative or inoperative positions.

Considering now the operation of the apparatus, let it be assumed that the grid wire 34 has been wound upon the mandrel 31 over the supports 33 and that this assembly is disposed in the position illustrated, with the reduced ends 30 of the mandrel resting in the supporting elements 26. The mandrel, therefore, will serve as an electrode in the welding circuit, it being formed of copper or other suitable conductive material resting in the copper elements 26, which in turn are disposed upon the copper plate 12 to which the bus-bar 16 is fixed. With the carriage at one of the starting positions, for example, as illustrated in Fig. 1 at the extreme right, the roller electrode 61 may be lowered under the force of the spring 46 by the movement of the handle 57 from the solid line position (Fig. 2) to the dot and dash line position, allowing the spring to force the electrode 61 into intimate engagement with the grid structure adjacent one of the supports 33, as illustrated in Fig. 7. The lever 73 of the valve 71 will then be moved into its vertical or open position to allow the inflammable material to be fed through the nozzle 69 and onto the grid structure in advance of the electrode 61. The motor 77 may then be energized to cause the shaft 76 to rotate in a given direction, and upon movement of the element 83 into its operative position through the aid of the handle 87 after the cam roller 89 has been moved free of its cam 90, the carriage may be moved at a predetermined speed to the left. During this movement of the carriage the electrode 61 rides over the convolutions of the grid wire 34 and causes welding of these convolutions to the adjacent support 33. By the feeding of the inflammable material 68 to the portions to be welded in advance of the welding operation or electrode 61, this material is ignited, causing a flash to burn away the oxygen and to remove any oxidized coatings on the grid wire and support so as to assure a satisfactory weld.

This operation continues until the carriage reaches the end of its travel controlled by the operator or by the cam 91. If by the latter, the carriage will stop its movement to the left by the cam roller 89 riding upon the cam 91, moving the arm 88 into the inoperative position and removing the element 83 from operative connection with the shaft 76. At this time means may be included to open the welding circuit if desired, and to also reverse the direction of the motor 77. During this first operation the convolutions of the grid wires 34 were welded to one of the supports 33. The mandrel may then be turned to present another support 33 to the welding position, and upon the return movement of the carriage the convolutions of the grid wire will be welded thereto. During this return movement the valve 71 is closed and the valve 72 opened through the movement of its lever 74 into the vertical position, so that the inflammable material will be fed to the grid structure in advance of the electrode 61. This operation is repeated until all four of the supports 33 have been welded to the adjacent convolutions of the grid wire, after which this mandrel with the complete grid structure thereon may be removed from the apparatus and another disposed in its place.

Although specific improvements of the invention have been shown and described, it will be understood that they are but illustrative and that various modifications may be made therein without departing from the scope and spirit of this invention as defined by the appended claims.

What is claimed is:

1. A welding apparatus comprising a support for an article to be welded, an electrode, means to include the electrode and the support in a welding circuit, a carriage for the electrode, reversible power means, an element supported by the carriage to connect the carriage with the power means to thereby cause reciprocation of the electrode, and means disposed adjacent the path of the carriage to cause movement of the element out of operative engagement with the power means to limit the distances the carriage and electrode will travel in both directions.

2. A welding apparatus comprising a support for an article to be welded, an electrode, means to include the electrode and the support in a welding circuit, a carriage for the electrode, reversible power means, means to connect the carriage thereto to thereby cause reciprocation of the electrode to weld different portions of the articles during the reciprocal movement of the electrode, and separate means movable with the carriage upon their respective sides of the electrode to selectively apply an inflammable material to the article in advance of the electrode, to cause burning of an oxide coating on the article in advance of the welding operation.

3. A welding apparatus comprising a support for an article to be welded, an electrode, means to include the electrode and the support in a welding circuit, a carriage for the electrode, rollers for supporting the carriage and tracks therefor to guide the carriage for reciprocable movement relative to the article, spaced guides parallel with the article, and a member supported by the carriage and movable between the guides to maintain the carriage in a fixed path parallel with the article.

4. A welding apparatus comprising a support for an article to be welded, an electrode, means to include the electrode and the support in a welding circuit, a carriage for the electrode, reversible power means, an element supported by the carriage to connect the carriage with the power means to thereby cause reciprocation of the electrode, an arm carried by the element, means to actuate the arm to move the element out of operative engagement with the power means to limit the distances the carriage and electrode will travel, and means to engage the arm when actuated to cause it to hold the element in its inoperative position.

5. A welding apparatus comprising a support for an article to be welded, an electrode, means to include the electrode and the support in a welding circuit, a carriage for the electrode, reversible power means, an element supported by the carriage to connect the carriage with the power means to thereby cause reciprocation of the electrode, an arm carried by the element, means to actuate the arm to move the element out of operative engagement with the power means to limit the distances the carriage and electrode will travel, and a unit operable through the arm to selectively hold the element in its operative and inoperative positions.

SAMUEL PITT.
DANIEL VAUGHN WATERS.

REFERENCES CITED

The following references are of record in the file of this patent:

UNITED STATES PATENTS

| Number | Name | Date |
| --- | --- | --- |
| 1,365,015 | Zwicker | Jan. 11, 1921 |
| 1,610,616 | Schlaf | Dec. 14, 1926 |
| 1,738,465 | Wagner et al. | Dec. 3, 1929 |
| 2,163,590 | Ganahl et al. | June 27, 1939 |
| 2,284,851 | Tiedemann | June 2, 1942 |
| 1,680,233 | Townsend | Aug. 7, 1928 |
| 2,033,851 | Roth | Mar. 10, 1936 |
| 1,115,943 | Knipe | Nov. 3, 1914 |
| 1,452,936 | Schuman | Apr. 29, 1923 |
| 2,040,349 | Wagner (2) | May 12, 1936 |
| 2,071,418 | McBerty | Feb. 23, 1931 |
| 2,367,715 | Chapman | Jan. 23, 1945 |